(12) United States Patent
Morrison

(10) Patent No.: US 6,170,052 B1
(45) Date of Patent: Jan. 2, 2001

(54) METHOD AND APPARATUS FOR IMPLEMENTING PREDICATED SEQUENCES IN A PROCESSOR WITH RENAMING

(75) Inventor: Michael J. Morrison, Santa Clara, CA (US)

(73) Assignee: Intel Corporation, Santa Clara, CA (US)

(*) Notice: Under 35 U.S.C. 154(b), the term of this patent shall be extended for 0 days.

(21) Appl. No.: 09/002,016

(22) Filed: Dec. 31, 1997

(51) Int. Cl.[7] .................................................. G06F 21/06
(52) U.S. Cl. .......................... 712/236; 712/23; 712/226; 712/240
(58) Field of Search ..................... 712/23, 29, 26, 712/209, 211, 214, 240, 207, 236, 239, 226

(56) References Cited

U.S. PATENT DOCUMENTS

| | | | |
|---|---|---|---|
| 5,452,426 | * 9/1995 | Papaworth et al. | 395/375 |
| 5,721,855 | * 2/1998 | Hilton et al. | 395/394 |
| 5,740,393 | * 4/1998 | Vidwans et al. | 395/391 |
| 5,889,982 | * 3/1999 | Rodgers et al. | 395/570 |

* cited by examiner

Primary Examiner—John A. Follansbee
Assistant Examiner—Dzung C. Nguyen
(74) Attorney, Agent, or Firm—Blakely, Sokoloff, Taylor & Zafman LLP

(57) ABSTRACT

Systems, apparatus, and methods are disclosed for generating pairs of conditional instructions corresponding to special predicate sequences from single instructions having a predicate. These pairs of conditional instructions update a destination register regardless of the truth or falsity of the predicate. The destination register is renamed to a new physical location. In this manner, register renaming can be used with predicate sequences to gain performance efficiencies and to overcome limitations of the prior attempted approaches.

34 Claims, 7 Drawing Sheets

```
Z = OP₃ {N,M} ;          Micro-op with destination Z     35
         •
         •
CMP{A, B} → Pₓ, P_y; Predicate evaluating micro-op      31  ⎤
Pₓ = 1: Z = OP₁ {C,D} ; Conditional micro-op            32  ⎬ 30
P_y = 1: Z = ADD{0, Z} ; Conditional micro-op           33  ⎦
         •
         •
R = OP₂{A, Z } ; Dependent micro-op                     34
```

Fig. 3

```
Z₂ = OP₃{N,M}; Micro-op with destination Z              40
         •
         •
CMP{A, B} → Pₓ, P_y ; Predicate evaluating micro-op     37  ⎤
Pₓ = 1: Z₁ = OP₁{C,D} ; Conditional micro-op            38  ⎬ 36
P_y = 1: Z₁ = ADD{0, Z₂} ; Conditional micro-op         39  ⎦
         •
         •
R = OP₂{A, Z₁ } ; Dependent micro-op                    41
```

Fig. 4

BINARY MACHINE WORD FOR MICRO-OP    CONDITION BIT
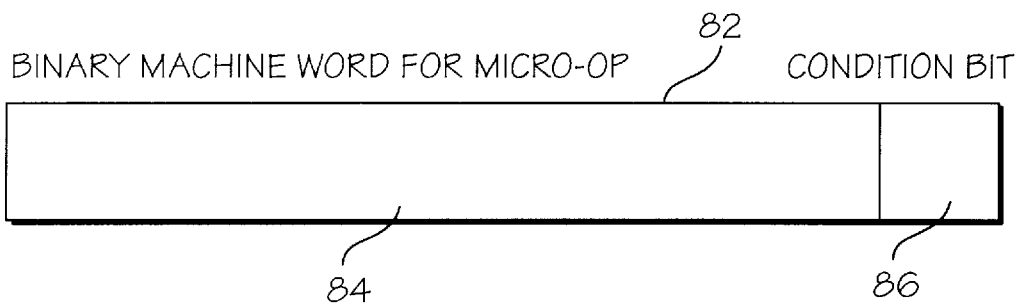
GENERAL MICRO-OP NOT SECOND MICRO-OP OF PREDICATE PAIR
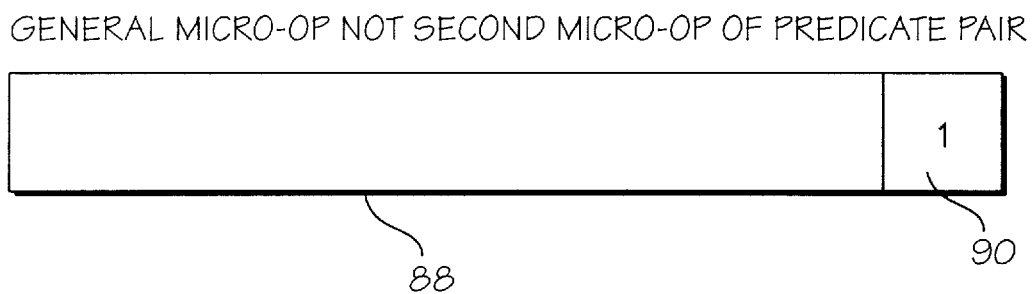
SECOND CONDITIONAL MICRO-OP OF PREDICATE PAIR
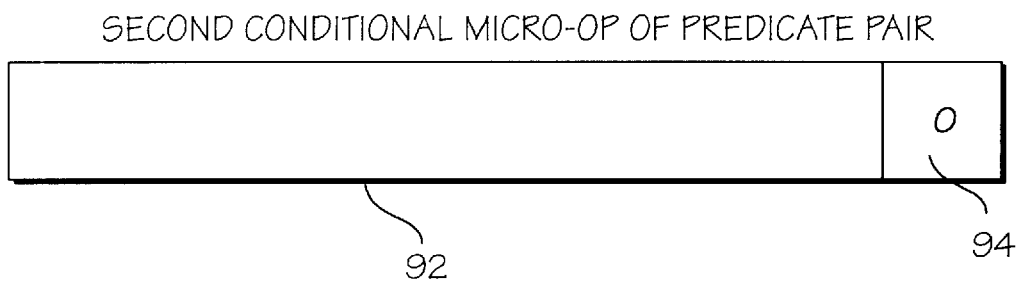
Fig. 7

METHOD AND APPARATUS FOR IMPLEMENTING PREDICATED SEQUENCES IN A PROCESSOR WITH RENAMING

BACKGROUND OF THE INVENTION

1. Field of the Invention

This invention relates generally to processors and computers, and more particularly, to a method and apparatus for implementing predicated sequences in a processor that renames registers.

2. Description of the Related Art

Modern processors and computers have increased their operating speed and efficiencies through a variety of methods. One method involves sequentially fetching instructions from caches and/or memory without waiting for prior instructions to be executed. A processor that uses the no-wait sequential fetching can operate more efficiently, because the instruction stored in the next sequential memory location is frequently the next instruction to be executed by the processor. No-wait sequential fetching enables the processor reduce the number of time periods when execution units remain idle due to no instruction being available for execution.

Occasionally, the instruction sequence will contain a branch instruction that jumps to a non-sequential memory address for the next instruction to be executed. After executing a branch instruction, instructions previously fetched from memory addresses that sequentially follow the address of the branch are flushed from fetch and execution pipelines. Flushes result in wasted processor time. In a processor that uses no-wait sequential fetching, software and/or hardware are employed to predict branch addresses so that instruction fetching can be redirected and flushes of fetch and execution pipelines avoided. Unfortunately, any method for predicting branch addresses makes some mispredictions, and each misprediction leads to a costly flush of the fetch and execution pipelines.

Sometimes branch instructions can be replaced by other instructions that do not make jumps to non-sequential memory addresses. For example, some conditional instructions may be implemented with either branch instructions or predicated sequences. Since predicated sequences do not introduce jumps to non-sequential memory addresses, implementing conditional instructions through predicated sequences can help a processor reduce the number of wasteful flushes of the fetch and execution pipelines.

FIG. 1 illustrates a predicated sequence 10. Predicated sequences are instruction sequences containing a predicate evaluating instruction and one or more associated conditional instructions. The predicate evaluating instruction determines whether a predicate about data is true or false. For example, a predicate evaluating instruction 12 determines whether the predicate that data words in registers A and B are equal is true or false. The predicate evaluating instruction 12 stores true or false information in paired predicate registers $P_x$ and $P_y$. $P_x$ and $P_y$ store conjugated logic information, i.e. when one register stores the value logic 1 the other register stores the value logic 0. The predicate evaluating instruction stores logic 1 in the predicate register $P_x$ if the predicate is true and stores logic 1 in the predicate register $P_y$ if the predicate is false. The second part of a predicated sequence includes one or more instructions whose execution is conditioned on whether the predicate is true or false, i.e. dependent on the logic information stored in the predicate registers $P_x$ and $P_y$. For example, the second instruction 14 is only executed if the predicate register $P_x$ stores the value logic 1, i.e., the first predicate evaluating instruction 12 determined that the predicate is true. If the predicate is false, the conditional instruction 14 is skipped and data in the register Z is unchanged. Program control by a true/false test enables predicated sequences to implement conditional instructions.

Predicated sequences include a predicate and one or more instructions whose execution depends on the predicate. The form of the predicate itself can vary in different predicated sequences. The form of the predicate evaluating instruction may employ a single predicate register $P_x$ and store logic 1 in the predicate register $P_x$ if the predicate is true and store logic 1 in the same predicate register $P_x$ if the predicate is false. The number of instructions whose execution is conditioned on the predicate also varies in different predicated sequences. Some predicated sequences have one instruction conditioned on the predicate being, for example, true. Some predicated sequences have first and second conditional instructions that are executed when the predicate is true and false, respectively. In the varied forms for predicated sequences, the conditional instructions are ordinarily in sequential memory locations that are executed sequentially.

Artificial dependencies among instructions lower the flexibility of the execution order thereby reducing the efficiency of an out-of-order processor. Register renaming eliminates artificial dependencies associated with write-after-write and write-after-read instruction sequences. Thus, register renaming can improve the efficiency of an out-of-order processor. Register renaming can lead, however, to problems when the instruction sequence contains predicated sequences.

FIG. 2 illustrates the effect of prior art renaming on the predicated sequence 10 in FIG. 1. In FIG. 1, the conditional instruction 14 and an earlier instruction 16 have the same destination register Z and form a write-after-write sequence, i.e. two instructions having the same destination registers. Therefore, a prior art renamer would replace the destination register Z of the conditional instruction 14 with a register $Z_1$, to produce renamed instructions 18, 16 having different destination registers $Z_1$, and Z, respectively.

Ordinarily, renaming removes artificial dependencies between instructions such that out-of-order execution does not change the results. In the prior art, renaming replaces logical registers of source addresses of an instruction with the physical register that was assigned to the most recent instruction having the same logical register as a destination address. Prior art renaming changes the nature of the predicated sequence, because later instructions (not shown), having Z as a source address, depend on "both" of the instructions 16, 14, in FIG. 1, and depend only on the conditional instruction 18 after renaming. Prior art renaming changes the real double dependencies of later instructions (not shown) on both of the instructions 14, 16. Renaming breaks the dependency of later instructions, having Z as a source register, on any earlier instruction when the predicate 12 is false.

Both renaming and predicated sequences can improve the performance of out-of-order processors. Renaming can eliminate artificial dependencies that would otherwise make the execution order of the instruction sequence less flexible. Predicated sequences can eliminate the need for some conditional branch instructions that could otherwise lead to mispredicted branches and processor flushes. Unfortunately, implementing predicated sequences with prior art renaming changes the results from a predicated sequence and will produce incorrect results.

The present invention is directed to overcoming, or at least reducing the effects of, one or more of the problems set forth above.

SUMMARY OF THE INVENTION

In one aspect of the present invention, a method is provided for renaming registers. The method includes renaming a destination register of a first conditional micro-op with a physical register, and renaming a destination register of a second conditional micro-op with the physical register. The first conditional micro-op belongs to a special predicated sequence. The second conditional micro-op belongs to the same special predicated sequence.

In another aspect of the present invention, an apparatus is provided. The apparatus includes a renamer to rename the destination registers of two conditional micro-ops with a single physical register in response to the two conditional micro-ops having the same destination register and belonging to a single special predicated sequence. The apparatus includes a rename table coupled to the renamer. The renamer is adapted to write the identity of the physical register that renames each destination register to a location of the rename table. The apparatus includes at least one execution unit coupled to the renamer. The execution unit is adapted to execute a portion of the micro-ops from the renamer.

BRIEF DESCRIPTION OF THE DRAWINGS

Other objectives and advantages of the invention will become apparent upon reading the following detailed description and upon reference to the drawings in which:

FIG. 3 shows a special predicated sequence employed by one embodiment of an out-of-order processor;

FIG. 4 shows the effect of register renaming on the special predicated sequence of FIG. 3;

FIG. 7 shows machine instructions used by a first embodiment of the processor of FIG. 5 to identify the second conditional micro-op of a special predicated sequence;

Figure 1:
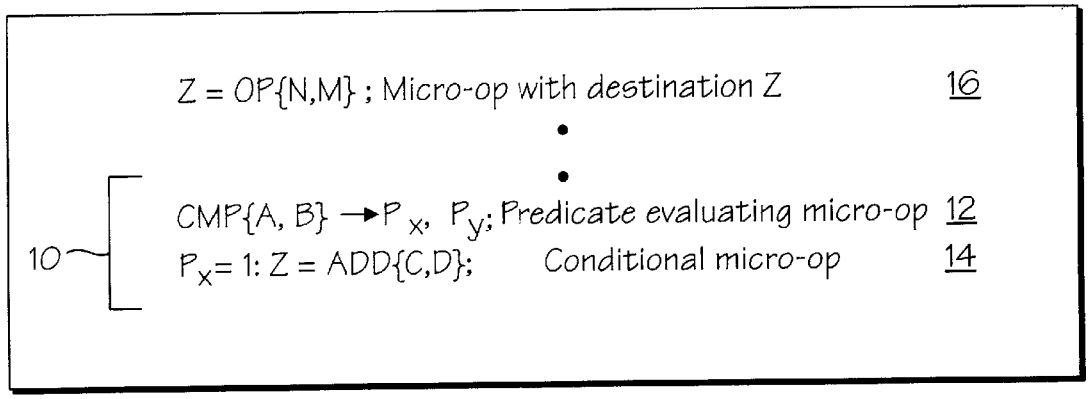
FIG. 1 illustrates the prior art use of a predicated sequence to implement a conditional instruction.
Figure 2:
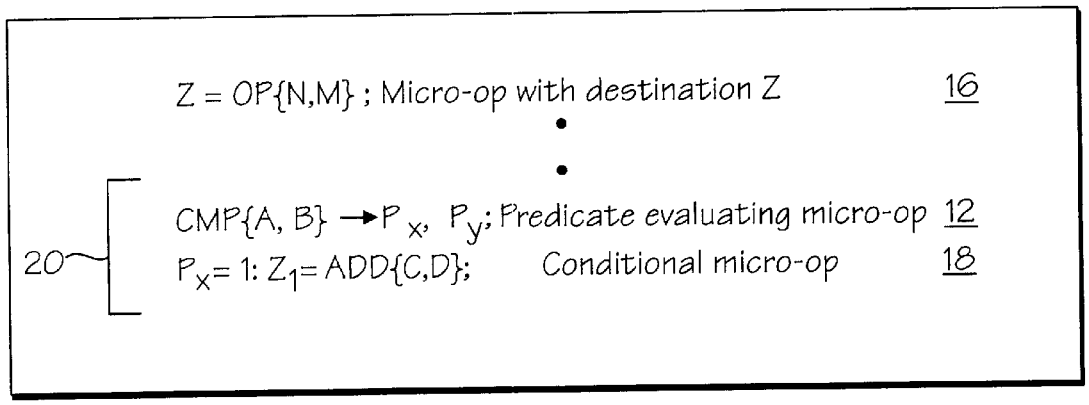
FIG. 2 illustrates the effect of prior art register renaming on the predicated sequence of FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The specific embodiments include hardware structures adapted to use special predicated sequences. The special predicated sequences include paired conditional instructions that update a destination register regardless of the truth or falsity of the predicate. The hardware structures insure that logical destination registers of the paired conditional instructions from the same special predicated sequence are renamed with the same physical register. Therefore, dependent instructions have a source register that is a destination address of a pair of conditional micro-ops of the special predicated sequence.

FIG. 3 illustrates a class of special predicated sequences 30 that is employed by some specific embodiments. The special predicated sequence 30 includes a predicate evaluating micro-op 31, which stores a value of logic 1 and of logic 0 in a predicate register $P_x$ when the predicate is true and is false, respectively. The special predicated sequence 30 also includes first and second conditional micro-ops 32, 33. The conditional micro-ops 32, 33 are executed when the condition $P_x$ is true and false, respectively. The first and second conditional micro-ops 32, 33 have the same logical destination register Z. The second conditional micro-op 33 restores a data previously stored in the register Z back in the same register Z when the predicate is false. Thus, the special predicated sequence 30 updates the contents of the register Z for both values, i.e. true or false, of the predicate $P_x$. A micro-op 34 that is both later in the instruction sequence and contains Z as a source address is dependent on both of the conditional micro-ops 32, 33 of the special predicated sequence 30.

In the specific embodiments, conditional micro-ops 32, 33 of a special predicated sequence 30 are paired so that destination addresses of the conditional micro-ops are updated whether or not the predicate is true. The specific embodiments may employ different types of conditional micro-ops and different numbers of conditional micro-ops than the micro-ops 32, 33 of FIG. 3, but the destination registers of the conditional micro-ops of a special predicated sequence are updated whether the predicate is true or false. In the specific embodiments described-below, the conditional micro-op 33 that restores a data word of the register Z in the same register Z is the third micro-op in the special predicated sequence 30. The present invention is intended to also include embodiments wherein the conditional micro-op of the special predicated sequence that restores a data word in the register in the same register is at another position in the special predicated sequence.

FIG. 4 illustrates one embodiment for renaming the special predicated sequence 30 of FIG. 3. In a renamed special predicated sequence 36, a physical destination register $Z_1$ replaces the logical destination register Z of the original special predicated sequence. In the renamed special predicated sequence 36, the destination address of both renamed conditional micro-ops 38, 39 is the same physical register $Z_1$. The source address of the second micro-op 39, which renames the conditional micro-op 33 of FIG. 3, points to a physical destination register $Z_2$ of a micro-op 40 that renames the micro-op 35 of FIG. 3. The micro-op 35 is the last micro-op of the instruction sequence that both has register Z as a logical destination address and is earlier in the instruction sequence than the predicated sequence 30. Thus, the logical source register of the second conditional micro-op 33 is renamed to point to the destination register of the last micro-op preceding the special predicated sequence 36. A dependent micro-op 34 with a source address that is a destination address of the conditional pair 32, 33 of FIG. 3 retains a source address that points to the renamed destination address of the two renamed conditional micro-ops 38, 39 of the special predicated sequence 36 of FIG. 4. The renamed special predicated sequence 36 updates the destination register $Z_1$, whether the predicate 37 is true or is false and a dependent micro-op 41 points to the same physical renamed destination register.

Figure 5:
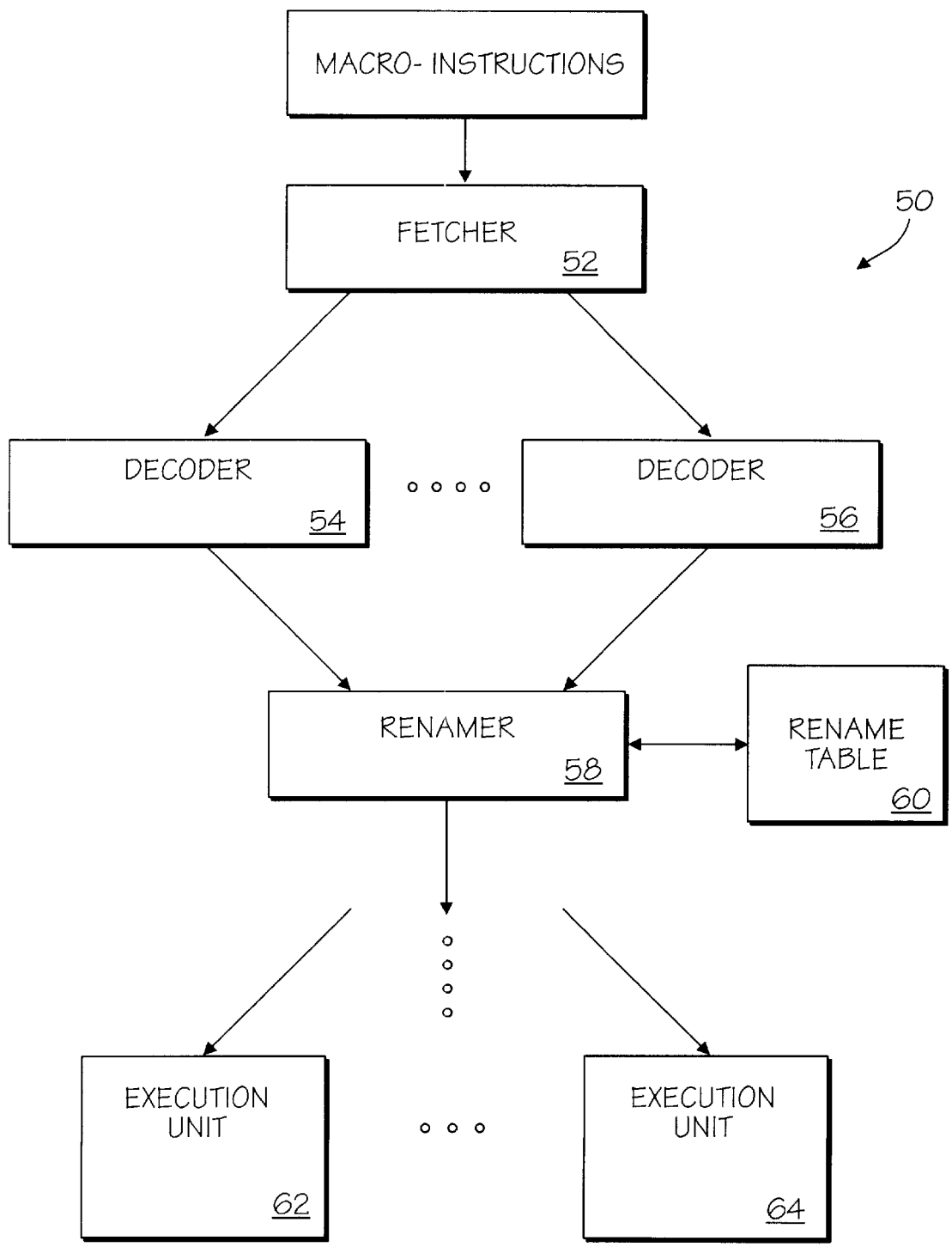
FIG. 5 shows a portion of an out-of-order processor that employs special predicated sequences of the type illustrated in FIGS. 3 and 4.

FIG. 5 illustrates a portion of an out-of-order processor 50. A fetcher 52 sequentially retrieves macro-instructions from memory and/or caches without waiting for previously fetched instructions to be executed. The fetcher 52 sends the macro instructions to one or more decoders 54, 56. The decoders 54, 56 translate the macro-instructions into executable micro-ops. The decoders 54, 56 translate one or more types of conditional instruction into the special predicated sequence, including the predicate evaluating micro-op 31 and the associated pair of conditional micro-ops 32, 33, as illustrated in FIG. 3. The decoders 54, 56 send the micro-ops to a renamer 58.

The renamer 58 employs blind renaming to replace logical registers appearing as destination addresses in micro-ops with different physical registers, i.e. removing artificial write-after-write and write-after-read dependencies. The renamer 58 recognizes paired conditional micro-ops associated with special predicated sequences and performs register renaming in a manner that is consistent with the method illustrated in FIG. 3. The renamer 58 records assignments of physical registers for logical destination registers in a rename table 60.

The renamed micro-ops are sent from the renamer 58 to one or more execution units 62, 64. In some embodiments, processor structures such as a scheduler (not shown) control and assign the execution of the renamed micro-ops by the execution units 62, 64. Execution preserves dependencies but not necessarily the original instruction order from the fetcher 52 or decoders 54, 56.

Figure 6:
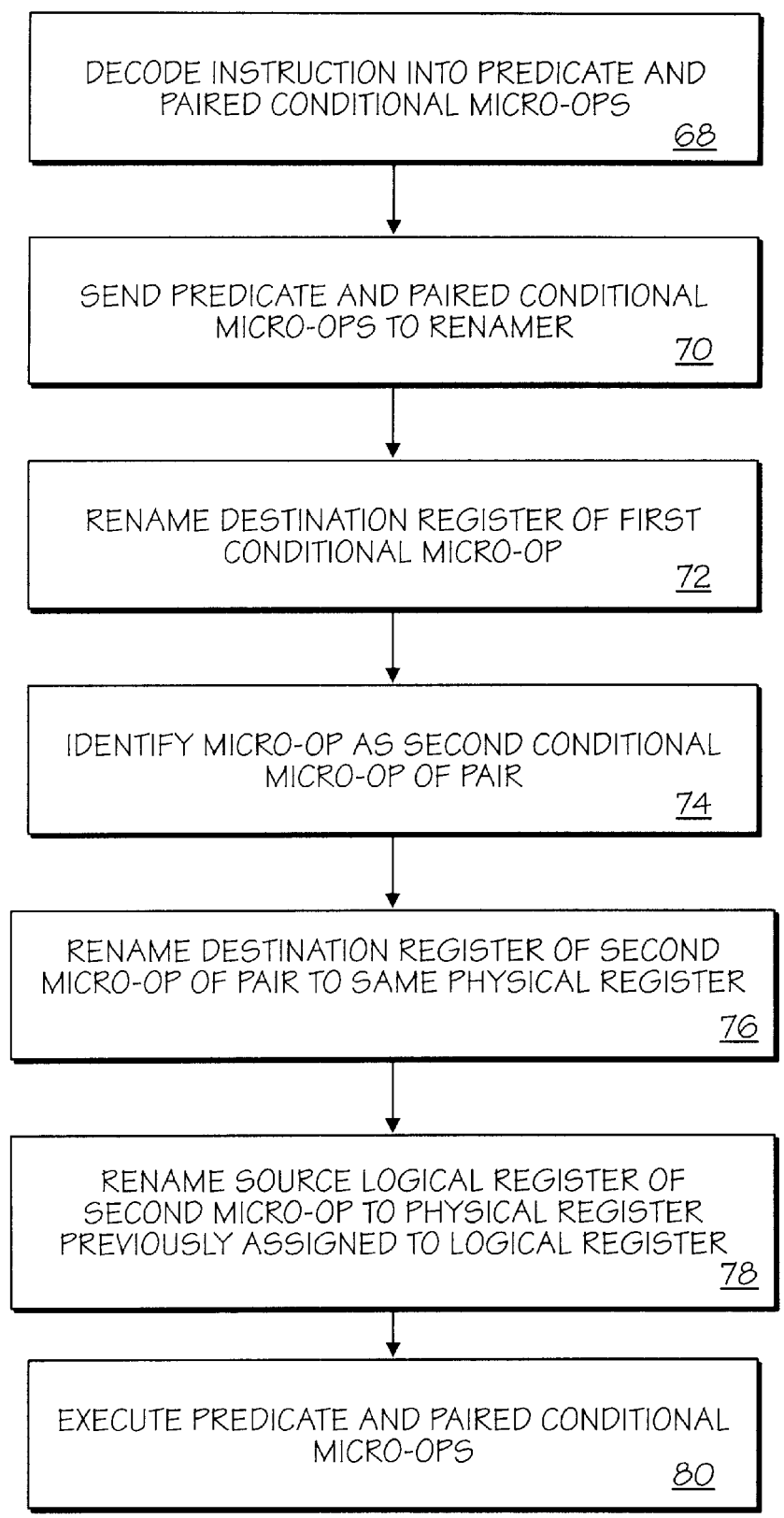
FIG. 6 is a flowchart illustrating a method for renaming and executing the special predicated sequence of FIG. 4.

FIG. 6 is a flowchart illustrating the steps of a method 66 for executing conditional instructions with special predicated sequences on the out-of-order processor 50 of FIG. 5. At block 68, the method begins by decoding a conditional instruction into a predicate evaluating micro-op 31 and an associated pair of conditional micro-ops 32, 33 having the form illustrated in FIG. 3. At block 70, the predicate and pair of conditional micro-ops are sequentially sent from one of the decoders 54, 56 to the renamer 58. At block 72, the logical destination register of the first conditional micro-op 32 of the predicate 30 is renamed with a physical register. At block 74, a micro-op received at the renamer 58 is identified as the second conditional micro-op 33 associated with the same predicated sequence 30. At block 76, the physical register that renames the logical destination register of the first conditional micro-op 32 is assigned to be the physical register that renames the logical destination register of the second conditional micro-op 33 of the pair 32, 33. At block 78, the logical register for the source address of the second conditional micro-op 33 is replaced with a physical register that renames the same logical register in a destination address of the last micro-op 40 in the instruction sequence that is earlier than the predicated sequence 30. At block 80, the predicate evaluating micro-op 37 and the associated pair of renamed conditional micro-ops 38, 39 are executed on one or more of the execution units 62, 64.

Referring to FIG. 7, the renamer 58 of one embodiment uses one bit of the binary machine word 82 of a micro-op to determine whether the micro-op is the second conditional micro-op 33 of a pair associated with a special predicated sequence 30. The binary machine word 82 has a number of binary bits 84 for identifying the form of the micro-op. At least one bit is a condition bit 86 that identifies the micro-op as the conditional micro-op 33 of a pair associated with a special predicated sequence 30. For micro-ops that are not the second conditional micro-op 33 of a special predicated sequence 30, the machine word 88 for the micro-op has the value logic 1 in its condition bit 90. For a micro-op that is the second conditional micro-op 33 of a predicated sequence 30, a machine word 92 for the micro-op has the value logic 0 in its condition bit 94. In this embodiment, the decoders 54, 56 initialize the condition bit 86 to have a value of logic 1 or logic 0 so that the renamer 58 can identify second conditional micro-ops 33 of special predicated sequences 30.

In other embodiments, the machine code for micro-ops does not have a condition bit 86 for identifying the second conditional micro-op 33 of the predicated sequence 30. Instead, the renamer 58 has hardware structures (not shown) for identifying the second conditional micro-op 33 of the predicated sequence 30. The hardware structures read more than one bit of the machine code for micro-ops. In one specific embodiment, the hardware structures trigger when the execution of a first micro-op depends on a logic value stored in a predicate register, e.g., the register $P_x$. Then, the renamer 58 looks for a later micro-op that depends on the value stored in the register $P_y$ conjugated to $P_x$ and has the same destination address. The renamer 58 identifies such a micro-op as the second conditional micro-op 33 of the same predicated sequence 30. The dependence on the conjugated predicate registers $P_y$ and $P_x$ can be implemented with neighboring bits of the machine words for micro-ops. The present invention is intended to cover embodiments employing other methods and apparatus for identifying second conditional micro-ops that an ordinary person in the art would be able to construct and use, without undue experimentation, in light of the present disclosure.

Figure 8:
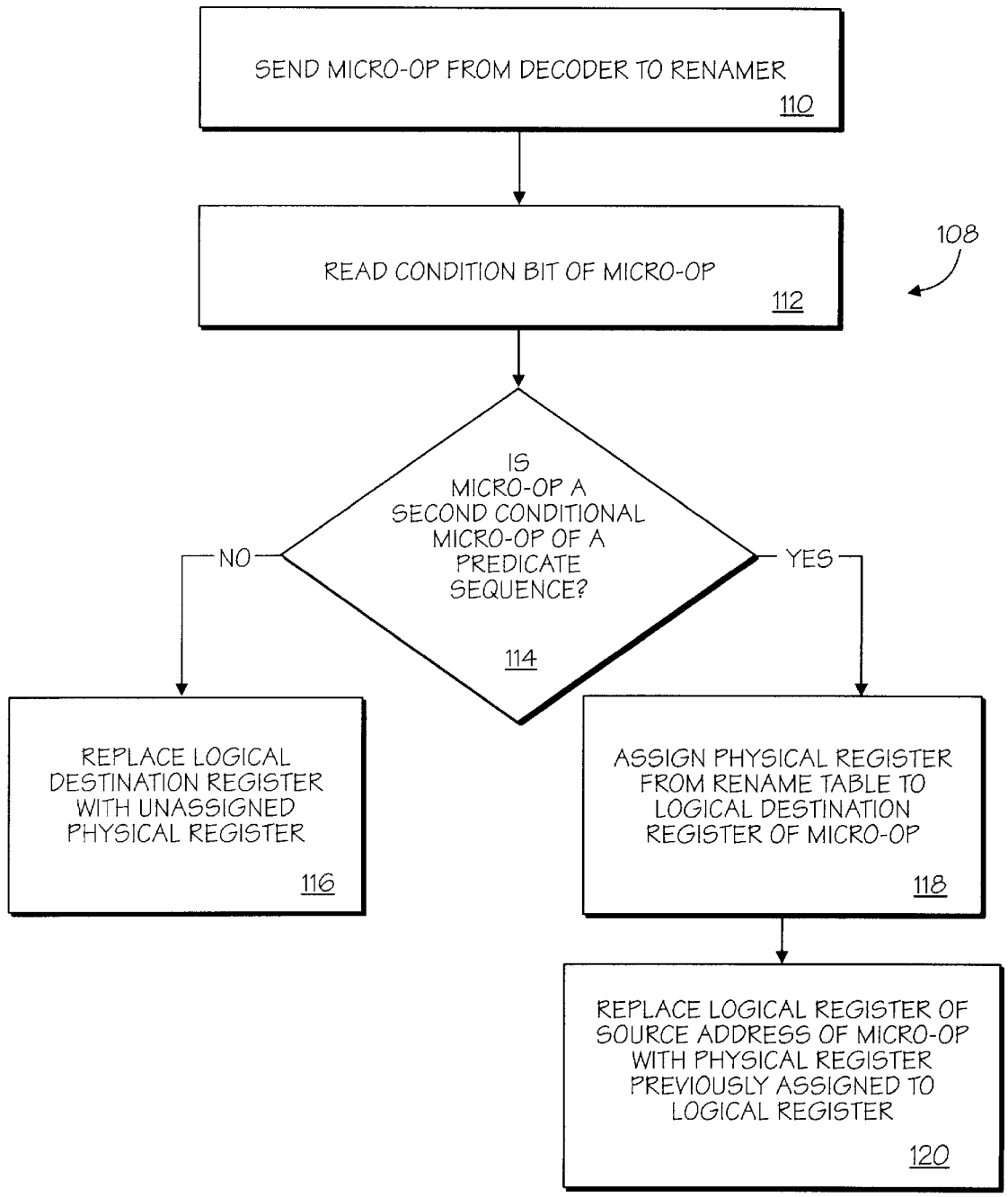
FIG. 8 is a flowchart for a first embodiment of the method of FIG. 6 that uses the machine instructions of FIG. 7.

FIG. 8 illustrates a method 108 for using the condition bit 86 of the machine word 82 for a micro-op to identify the second conditional micro-op 33 of a special predicated sequence 30. At block 110, the machine word 82 for a micro-op from one of the decoders 54, 56 is sent to the renamer 58. At block 112, the condition bit 86 of the machine word 82 for the micro-op is read with hardware of the renamer 58. At block 114, whether the micro-op is a second conditional instruction 33 of a special predicated sequence 30 is determined from the value 90, 94, i.e. logic 1 or logic 0, of the condition bit 86. At block 116, the logical destination register of the micro-op is replaced with an unassigned physical register is replaced in response to the micro-op not being a second conditional micro-op 32 of a special predicated sequence 30. At block 118, a physical register assigned to the logical destination register of the micro-op is looked up in the rename table 60, and assigned the same physical register is assigned for the logical destination register of the micro-op in response to determining, at block 114, that the micro-op is a second conditional micro-op 33 of a special predicated sequence 30. At block 118, the physical register in the rename table 60 is the destination register of the first conditional micro-op 32 of the same special predicated sequence 30. At block 120, the logical source register of the micro-op in the renamer 58 is replaced with the physical register that was previously assigned to the logical register. The physical register previously assigned to the logical source register renames the destination address of the latest micro-op 35 in the instruction sequence that both has the logical register as a destination address and is earlier than the special predicated sequence 30 in the instruction order.

Figure 9:
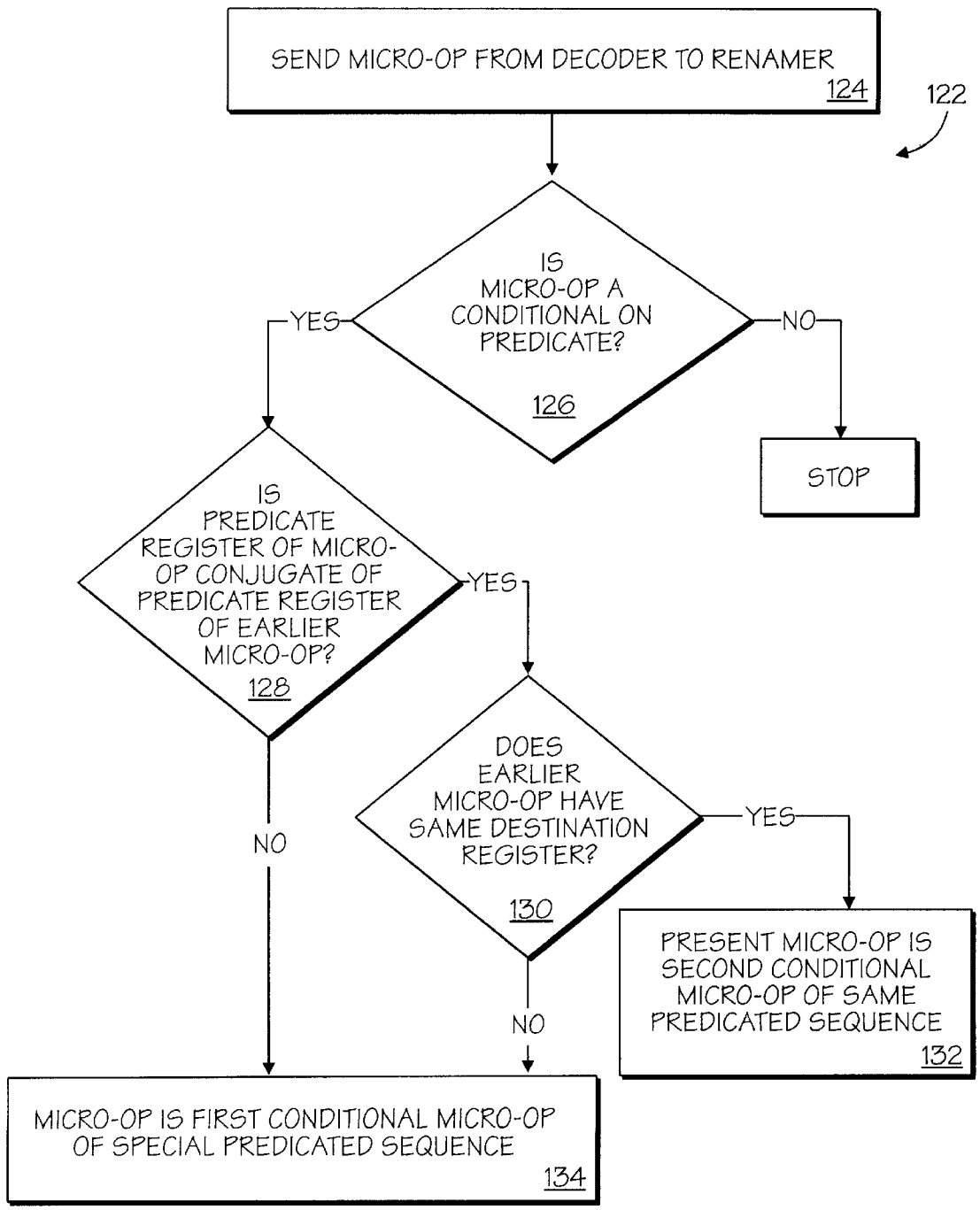
FIG. 9 is a flowchart for a second embodiment for identifying conditional micro-ops of special predicated sequences in the method of FIG. 6.

FIG. 9 illustrates a second method 122 for identifying the second conditional micro-op 33 of a special predicated sequence 30. At block 124, the machine word 82 for a micro-op is sent from one of the decoders 54, 56 to the renamer 58. At block 126, the renamer 58 determines whether the execution of the micro-op is dependent on the value stored in a predicate register. If the execution depends the value in a predicate register, the micro-op is a conditional micro-op 32, 33 of a special predicated sequence 30. The machine word for the micro-op may have several bits for indicating dependencies on predicate registers. At block 128, if the micro-op is a conditional micro-op 32, 33 of a special predicated sequence 30, the renamer 58 determines whether the predicate register of the micro-op is the conjugate of a predicate register appearing in an earlier micro-op in the instruction sequence. At block 130, the renamer 58 determines whether the present micro-op and the earlier micro-op have the same destination register. If the two micro-ops have the same destination register, the present micro-op is determined to be the second conditional micro-op 33 of the same special predicate sequence 30 at block 132. At block 134, the renamer 134 determines that the micro-op is a first conditional micro-op 32 if the micro-op is conditional on the value stored in a predicate register but not a second conditional micro-op 33.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of renaming comprising:
    generating a special predicate sequence for a micro-op instruction having a predicate, the special predicate sequence including a first and second conditional micro-op instructions for updating a destination register of the micro-op instruction regardless of the truth or falsity of the predicate;
    renaming the destination register of the first conditional micro-op instruction with a physical register; and
    renaming the destination register of the second conditional micro-op instruction with the physical register.

2. The method of claim 1, further comprising decoding a sequence of at least one instruction into the special predicated sequence.

3. The method of claim 2, wherein the acts of renaming replace a logical address register introduced by the act of decoding the sequence of at least one instruction into a micro-op with the physical register.

4. The method of claim 2, further comprising sending the micro-ops of the special predicated sequence to a renamer in consecutive cycles.

5. The method of claim 1, further comprising renaming a source register of the second conditional micro-op with a physical register that renames the logical register in a third micro-op, the third micro-op being earlier in an instruction sequence of micro-ops than the first and second conditional micro-ops.

6. The method of claim 1, wherein the step of renaming a first micro-op includes recording the physical register that renames the destination register of the first micro-op in a rename table.

7. The method of claim 1, further comprising determining whether the second micro-op is both a conditional micro-op of a special predicated sequence and is for restoring a data word to a destination register that previously stored the data word, the step of renaming a destination register of a second conditional micro-op being performed in response to determining that the second micro-op is both a conditional micro-op of a special predicated sequence and is for restoring a data word to a destination register that previously stored the data word.

8. The method of claim 7, wherein the step of determining includes reading a condition bit of a machine word for the second micro-op.

9. The method of claim 1, further comprising:
    storing the identity of a physical register that previously renamed the destination register in a special location in response to receiving the first conditional micro-op; and
    storing the identity of the physical register that renames the destination register in a rename table.

10. The method of claim 1, further comprising executing at least one of the first and second micro-ops out-of-order.

11. The method of claim 1, wherein the steps of renaming include renaming micro-ops of a first type of predicated sequence, the first type of predicated sequence being a sequence of micro-ops that consists of a predicate evaluating micro-op, a third micro-op, and a fourth micro-op, the third micro-op being executed in response to the predicate being true, and the fourth micro-op being executed in response to the predicate being false, the fourth micro-op being for restoring a data word to a register that previously stored the data word.

12. The method of claim 1, wherein the micro-op instruction is an if-then type instruction.

13. The method of claim 12, wherein the micro-op instruction is a cmp instruction.

14. An apparatus, comprising:
    a special predicate sequence generator to generate a single special predicated sequence from a micro-op instruction having a predicate, the special predicate sequence including at least two conditional micro-ops for updating a same destination register regardless of the truth or falsity of the predicate;
    a renamer to rename the destination register of the two conditional micro-ops with a single physical register;
    a rename table coupled to the renamer, the renamer being adapted to write the identity of the physical register that renames each destination register to a location of the rename table; and
    at least one execution unit coupled to the renamer, the execution unit being adapted to execute a portion of the micro-ops from the renamer.

15. The apparatus of claim 14, further comprising at least one decoder having an output terminal coupled to an input terminal of the renamer, the decoder to produce the special predicated sequence of micro-ops in response to receiving a special sequence of at least one instruction.

16. The apparatus of claim 15, wherein the decoder is adapted to produce a machine word for each micro-op, the machine word having a condition bit.

17. The apparatus of claim 16, wherein the renamer is capable of determining that a particular micro-op is a conditional micro-op of a special predicated sequence in response to determining that the condition bit of the machine word for the particular micro-op has a preselected value, the particular micro-op for restoring a data word to a register that previously stored the data word.

18. The apparatus of claim 15, wherein the renamer is adapted to receive the micro-ops of each special predicated sequence in consecutive cycles and the decoder is adapted to send the micro-ops to an input terminal of the renamer in consecutive cycles.

19. The apparatus of claim 15, wherein the renamer is capable of renaming logical registers, the logical register being used by the decoder to decode instructions into micro-ops.

20. The apparatus of claim 14, further comprising a second execution unit coupled to the renamer, the two execution units capable of executing a portion of the micro-ops from the renamer out-of-order.

21. The apparatus of claim 14, wherein the renamer is adapted to store the identity of a physical register that previously renamed a logical register to a special location in response to receiving the first conditional micro-op of the single special predicated sequence, the destination register of the first conditional micro-op being the logical register.

22. The apparatus of claim 21, wherein the renamer is adapted to rename the source address of one of the first conditional micro-op and the second conditional micro-op with the identity of the physical register stored to the special location, in response to the source address being the logical register that the physical register whose identity is stored to the special location previously renamed.

23. The method of claim 14, wherein the micro-op instruction is an if-then type instruction.

24. The method of claim 23, wherein the micro-op instruction is a cmp instruction.

25. An out-of-order processor, comprising:

a fetcher;

means for receiving instructions from the fetcher and decoding at least one instruction into a special predicated sequence, the special predicate sequence corresponding to one of the at least one instruction and including a first and second conditional instructions for updating a destination register of the instruction regardless of the truth or falsity of a predicate of the instruction; and means for renaming logical registers in the special predicated sequence, the means for renaming being coupled to an output terminal of the means for decoding.

26. The processor of claim 25, further comprising at least two execution units, the two execution units being coupled to the means for renaming and being adapted to execute a portion of the first and second conditional instructions received from the means for renaming out-of-order.

27. The processor of claim 26, further comprising a rename table coupled to the means for renaming, the rename table for recording the physical register that renames each logical register.

28. The method of claim 25, wherein the instruction is an if-then type instruction.

29. The method of claim 28, wherein the instruction is a cmp instruction.

30. An out-of-order processor, comprising:

a fetcher;

at least one decoder to receive instructions from the fetcher, the decoder being capable of decoding a sequence of at least one instruction into a special predicated sequence, the special predicate sequence corresponding to one of the at least one instruction and including a first and second conditional micro-op instructions for updating a destination logical register of the instruction regardless of the truth or falsity of a predicate of the instruction; and a renamer being adapted to rename the first and second conditional micro-ops of the special predicated sequence and being coupled to an output terminal of the decoder, the renamer to replace the destination logical register appearing as a destination address in the first and second conditional micro-op instructions of the special predicated sequence with a single physical register.

31. The processor of claim 30, further comprising at least two execution units coupled to the renamer, the execution units being capable of executing a portion of the first and second conditional micro-op instructions from the renamer out-of-order.

32. The processor of claim 31, further comprising a rename table coupled to the renamer, the rename table adapted to record the physical register that renames each logical register.

33. The method of claim 30, wherein the one of the at least one instruction is an if-then type instruction.

34. The method of claim 33, wherein the one of the at least one instruction is a cmp instruction.

* * * * *